United States Patent
Li et al.

(10) Patent No.: US 12,306,485 B2
(45) Date of Patent: May 20, 2025

(54) ELECTRONIC DEVICE

(71) Applicant: InnoLux Corporation, Miao-Li County (TW)

(72) Inventors: Jyun-Sian Li, Miao-Li County (TW); Hong-Sheng Hsieh, Miao-Li County (TW); Jo-Hsin Wang, Miao-Li County (TW); Hao-Yu Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/194,044

(22) Filed: Mar. 31, 2023

(65) Prior Publication Data
US 2023/0350239 A1    Nov. 2, 2023

(30) Foreign Application Priority Data

Apr. 27, 2022 (CN) .......................... 202210458176.6

(51) Int. Cl.
| | |
|---|---|
| G02F 1/13 | (2006.01) |
| G02F 1/1335 | (2006.01) |
| G02F 1/1337 | (2006.01) |
| G02F 1/1347 | (2006.01) |

(52) U.S. Cl.
CPC ...... *G02F 1/1323* (2013.01); *G02F 1/133528* (2013.01); *G02F 1/1337* (2013.01); *G02F 1/13471* (2013.01)

(58) Field of Classification Search
None
See application file for complete search history.

(56) References Cited

U.S. PATENT DOCUMENTS

| | | | |
|---|---|---|---|
| 2008/0123025 A1* | 5/2008 | Li | G02F 1/1396 349/74 |
| 2017/0075171 A1* | 3/2017 | Lee | G02F 1/133711 |
| 2018/0329245 A1* | 11/2018 | Robinson | G02F 1/134309 |
| 2020/0049996 A1* | 2/2020 | Yan | G02B 27/0172 |

(Continued)

FOREIGN PATENT DOCUMENTS

TW    I718641 B    2/2021

OTHER PUBLICATIONS

Extended European Search Report dated Sep. 18, 2023, issued in application EP 23167573.7.

*Primary Examiner* — Shan Liu
(74) *Attorney, Agent, or Firm* — McClure, Qualey & Rodack, LLP

(57) ABSTRACT

An electronic device is provided. The electronic device includes a first privacy panel and a second privacy panel disposed on the first privacy panel. The first privacy panel has a first alignment layer and a second alignment layer opposite each other. The second privacy panel has a third alignment layer and a fourth alignment layer opposite each other. The alignment axes of the first alignment layer, the second alignment layer, the third alignment layer and the fourth alignment layer are parallel. The angle between the alignment direction of the first alignment layer and the alignment direction of the third alignment layer is in a range from 160 to 200 degrees. The angle between the alignment direction of the second alignment layer and the alignment direction of the fourth alignment layer is in a range from 160 to 200 degrees.

7 Claims, 10 Drawing Sheets

(56) References Cited

U.S. PATENT DOCUMENTS

| | | |
|---|---|---|
| 2021/0048697 A1 | 2/2021 | Chen et al. |
| 2021/0341799 A1 | 11/2021 | Woodgate et al. |
| 2022/0413338 A1* | 12/2022 | Matsushima ....... G02F 1/13787 |
| 2023/0229048 A1* | 7/2023 | Sakai .................... G02F 1/1347 |
| | | 349/15 |
| 2023/0296932 A1* | 9/2023 | Murata ................ G02F 1/1323 |
| | | 349/56 |

* cited by examiner

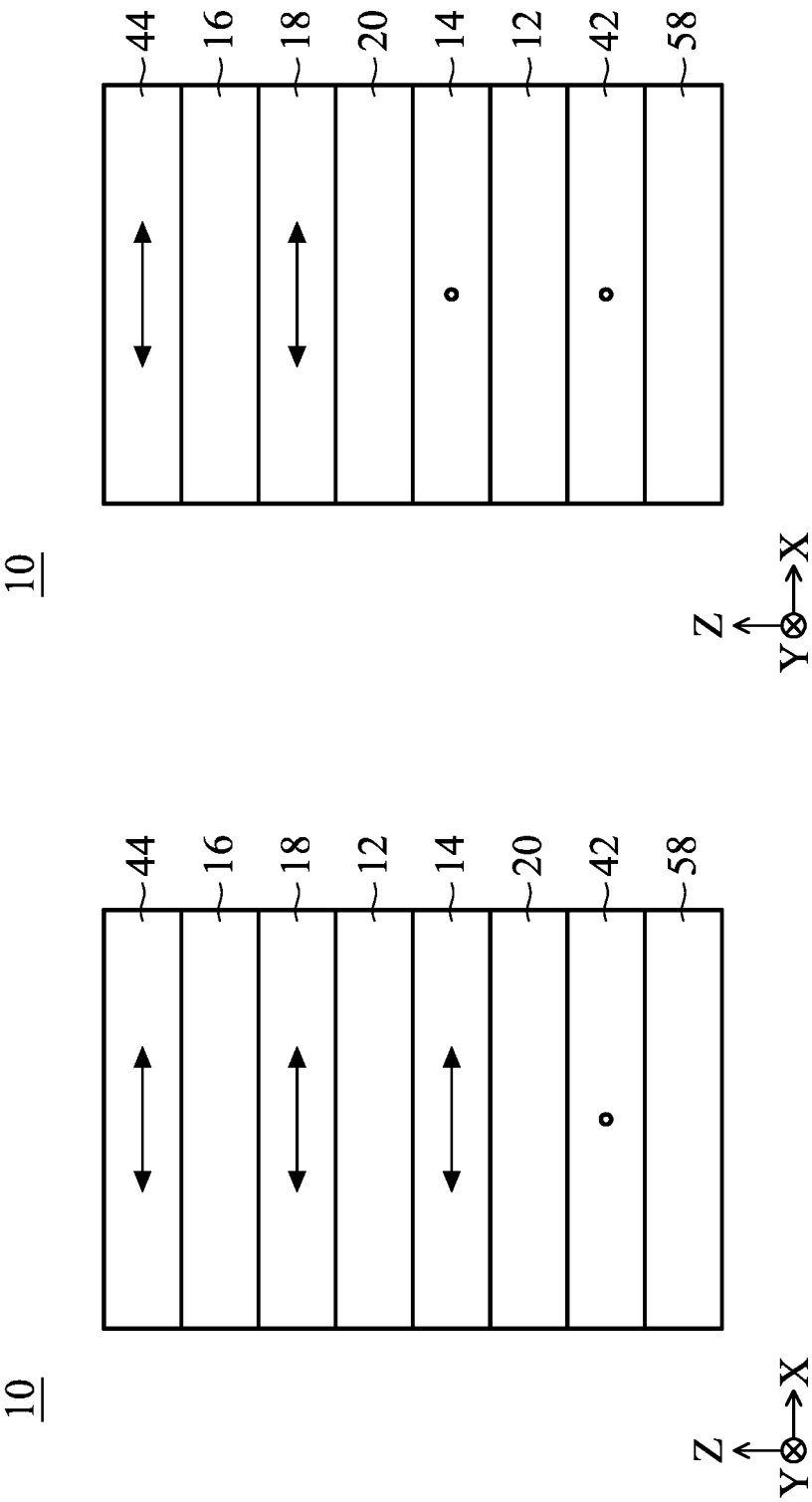

ELECTRONIC DEVICE

CROSS REFERENCE TO RELATED APPLICATIONS

This application claims priority of China Patent Application No. 202210458176.6, filed on Apr. 27, 2022, the entirety of which is incorporated by reference herein.

BACKGROUND

Technical Field

The present disclosure relates to an electronic device, and in particular it relates to an electronic device with dual privacy panels.

Description of the Related Art

Electronic products are widely used in different types of products. Different products have different requirements for privacy. For example, car monitors. Based on driving safety considerations, the monitor in the passenger's seat must have a privacy function, so as to reduce interference with the driver's concentration when playing video or displaying pictures or text.

However, in the privacy modes employed by current privacy technology, the driver's viewing angle (for example, 30-50 degrees side viewing angle) will have a bluish chromatic aberration or light leakage at large viewing angles.

Therefore, how to improve the above problems is a topic at present that needs to be discussed by the industry.

SUMMARY

In accordance with one embodiment of the present disclosure, an electronic device is provided. The electronic device includes a first privacy panel and a second privacy panel disposed on the first privacy panel. The first privacy panel has a first alignment layer and a second alignment layer opposite each other. The second privacy panel has a third alignment layer and a fourth alignment layer opposite each other. The second alignment layer and the third alignment layer are located between the first alignment layer and the fourth alignment layer. The alignment axes of the first alignment layer, the second alignment layer, the third alignment layer and the fourth alignment layer are parallel. The angle between the alignment direction of the first alignment layer and the alignment direction of the third alignment layer is in a range from 160 to 200 degrees. The angle between the alignment direction of the second alignment layer and the alignment direction of the fourth alignment layer is in a range from 160 to 200 degrees.

A detailed description is given in the following embodiments with reference to the accompanying drawings.

BRIEF DESCRIPTION OF THE DRAWINGS

The disclosure can be more fully understood from the following detailed description when read with the accompanying figures. It is worth noting that in accordance with standard practice in the industry, various features are not drawn to scale. In fact, the dimensions of the various features may be arbitrarily increased or reduced for clarity of discussion.

FIGS. 3-2($a$)-($c$) show diagrams of a chromaticity (Dx) varying with thickness of a liquid-crystal layer under a specific viewing-angle area with a single privacy panel in accordance with one embodiment of the present disclosure;

FIGS. 3-3($a$)-($c$) show diagrams of a chromaticity (Dy) varying with thickness of a liquid-crystal layer under a specific viewing-angle area with a single privacy panel in accordance with one embodiment of the present disclosure;

FIGS. 4-1($a$)-($c$) show diagrams of a lowest brightness area varying with thickness of a liquid-crystal layer under a specific viewing-angle area with a single privacy panel in accordance with another embodiment of the present disclosure;

FIGS. 4-2($a$)-($c$) show diagrams of a chromaticity (Dx) varying with thickness of a liquid-crystal layer under a specific viewing-angle area with a single privacy panel in accordance with another embodiment of the present disclosure;

FIGS. 4-3($a$)-($c$) show diagrams of a chromaticity (Dy) varying with thickness of a liquid-crystal layer under a specific viewing-angle area with a single privacy panel in accordance with another embodiment of the present disclosure;

FIG. 9 shows a cross-sectional view of an electronic device in accordance with one embodiment of the present disclosure; and FIG. 10 shows a cross-sectional view of an electronic device in accordance with one embodiment of the present disclosure.

DETAILED DESCRIPTION

Figure 1A:
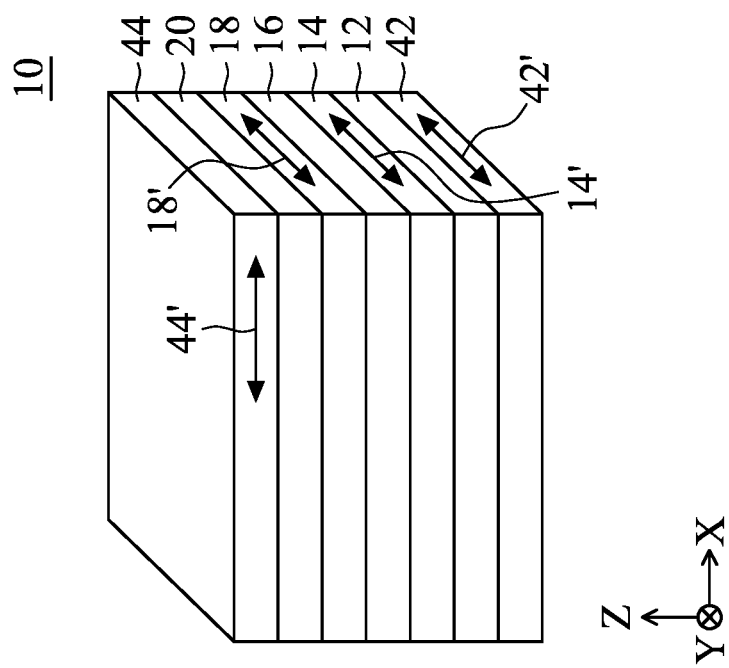
FIG. 1A shows a cross-sectional view of an electronic device in accordance with one embodiment of the present disclosure.

Various embodiments or examples are provided in the following description to implement different features of the present disclosure. The elements and arrangement described in the following specific examples are merely provided for introducing the present disclosure and serve as examples without limiting the scope of the present disclosure. For example, when a first component is referred to as "on a second component", it may directly contact the second component, or there may be other components in between, and the first component and the second component do not come in direct contact with one another.

It should be understood that additional operations may be provided before, during, and/or after the described method. In accordance with some embodiments, some of the stages (or steps) described below may be replaced or omitted.

In this specification, spatial terms may be used, such as "below", "lower", "above", "higher" and similar terms, for briefly describing the relationship between an element relative to another element in the figures. Besides the directions illustrated in the figures, the devices may be used or operated in different directions. When the device is turned to different directions (such as rotated 45 degrees or other directions), the spatially related adjectives used in it will also be interpreted according to the turned position. In some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Herein, the terms "about", "around" and "substantially" typically mean a value is in a range of +/−15% of a stated value, typically a range of +/−10% of the stated value, typically a range of +/−5% of the stated value, typically a range of +/−3% of the stated value, typically a range of +/−2% of the stated value, typically a range of +/−1% of the stated value, or typically a range of +/−0.5% of the stated value. It should be noted that, in the description, when it is mentioned that direction A is approximately parallel to direction B, it means that the included angle between direction A and direction B is between 0 degrees and 15 degrees (0 degrees≤included angle≤15 degrees). It should be noted that, in the description, when it is mentioned that direction A is approximately perpendicular to direction B, it means that the included angle between direction A and direction B is between 75 degrees and 90 degrees (75 degrees≤included angle≤90 degrees).

It should be understood that, although the terms "first", "second", "third", etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer, portion or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

Referring to FIG. 1A, in accordance with one embodiment of the present disclosure, an electronic device 10 is provided. FIG. 1A is the cross-sectional view of the electronic device 10.

As shown in FIG. 1A, the electronic device 10 includes a first privacy panel 12, a polarizer 14, a second privacy panel 16, a polarizer 18, and a display panel 20. The second privacy panel 16 is disposed on the first privacy panel 12. The polarizer 14 is disposed between the first privacy panel 12 and the second privacy panel 16. The display panel 20 is disposed on the second privacy panel 16. The polarizer 18 is disposed between the second privacy panel 16 and the display panel 20.

Figures 1B, 1C:
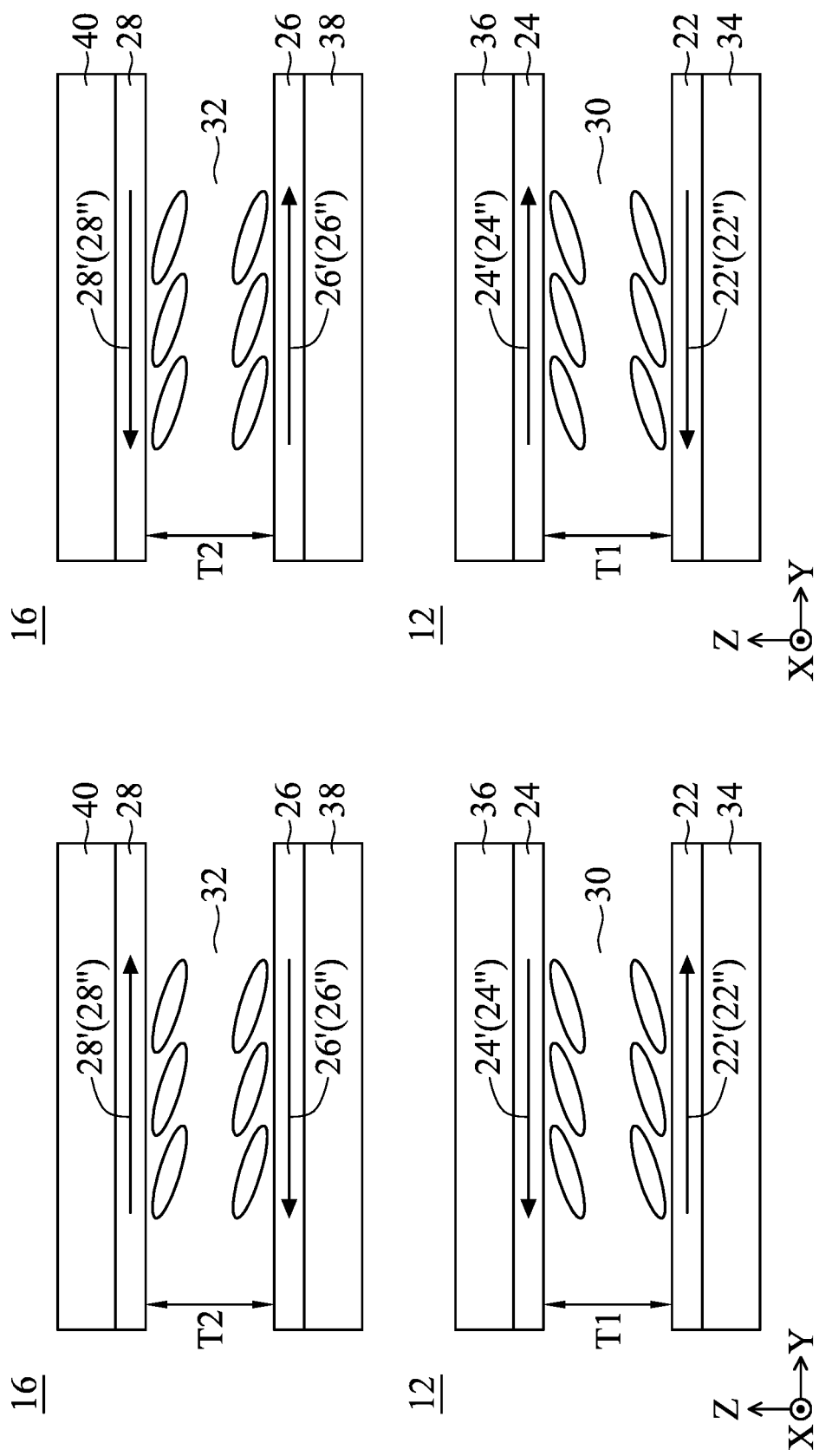
FIG. 1B shows an enlarged cross-sectional view of two privacy panels of an electronic device in accordance with one embodiment of the present disclosure.
FIG. 1C shows an enlarged cross-sectional view of two privacy panels of an electronic device in accordance with one embodiment of the present disclosure.

FIG. 1B is an enlarged cross-sectional view of two privacy panels of an electronic device in accordance with one embodiment of the present disclosure. As shown in FIG. 1B, the first privacy panel 12 has a first alignment layer 22 and a second alignment layer 24 opposite each other. The second privacy panel 16 has a third alignment layer 26 and a fourth alignment layer 28 opposite each other. The second alignment layer 24 and the third alignment layer 26 are located between the first alignment layer 22 and the fourth alignment layer 28. The alignment axis 22' of the first alignment layer 22, the alignment axis 24' of the second alignment layer 24, the alignment axis 26' of the third alignment layer 26, and the alignment axis 28' of the fourth alignment layer 28 are parallel. Here "alignment axes being parallel" means that, for example, taking the alignment axis 22' of the first alignment layer 22 as a reference, the angle difference between the alignment axis 22' of the first alignment layer 22 and the alignment axis 24' of the second alignment layer 24, the alignment axis 26' of the third alignment layer 26, and the alignment axis 28' of the fourth alignment layer 28 is within about 20 degrees. In FIG. 1B, the alignment axis 22' of the first alignment layer 22, the alignment axis 24' of the second alignment layer 24, the alignment axis 26' of the third alignment layer 26, and the alignment axis 28' of the fourth alignment layer 28 may be substantially parallel to Y axis, but not limited thereto. In addition, the angle between the alignment direction 22" (as indicated by the arrow in the figure) of the first alignment layer 22 and the alignment direction 26" (as indicated by the arrow in the figure) of the third alignment layer 26 is in a range from about 160 to about 200 degrees. The angle between the alignment direction 24" (as indicated by the arrow in the figure) of the second alignment layer 24 and the alignment direction 28" (as indicated by the arrow in the figure) of the fourth alignment layer 28 is in a range from about 160 to about 200 degrees. The above-mentioned alignment direction is, for example, a tilting direction of liquid-crystal molecules adjacent to the alignment layer. The alignment direction may be substantially the alignment direction of the plush cloth. In the first privacy panel 12, the angle between the alignment direction 22" (as indicated by the arrow in the figure) of the first alignment layer 22 and the alignment direction 24" (as indicated by the arrow in the figure) of the second alignment layer 24 is in a range from about 160 to about 200 degrees. In the second privacy panel 16, the angle between the alignment direction 26" (as indicated by the arrow in the figure) of the third alignment layer 26 and the alignment direction 28" (as indicated by the arrow in the figure) of the fourth alignment layer 28 is in a range from about 160 to about 200 degrees.

The first privacy panel 12 further includes a first liquid-crystal layer 30 disposed between the first alignment layer 22 and the second alignment layer 24. The second privacy panel 16 further includes a second liquid-crystal layer 32 disposed between the third alignment layer 26 and the fourth alignment layer 28. In some embodiments, the thickness T1 of the first liquid-crystal layer 30 may be different from the thickness T2 of the second liquid-crystal layer 32. The thickness T1 of the first liquid-crystal layer 30 may be obtained by, for example, measuring the distance between the first alignment layer 22 and the second alignment layer 24 in the third direction D3. The thickness T2 of the second liquid-crystal layer 32 may be obtained by, for example, measuring the distance between the third alignment layer 26 and the fourth alignment layer 28 in the third direction D3. In other embodiments, when the first privacy panel 12 or the second privacy panel 16 includes a plastic frame (not shown) surrounding the first liquid-crystal layer 30 or the second liquid-crystal layer 32, the thickness T1 of the first liquid-crystal layer 30 is obtained by, for example, measuring the thickness of the plastic frame of the first privacy panel 12 in the third direction D3. The thickness T2 of the second liquid-crystal layer 32 is obtained by, for example, measuring the thickness of the plastic frame of the second privacy panel 16 in the third direction D3.

In some embodiments, the thickness T1 of the first liquid-crystal layer 30 may be the same as the thickness T2 of the second liquid-crystal layer 32. The aforementioned difference between the thickness T1 and the thickness T2 means that the difference between the two is at least greater than or equal to 0.2 μm. In some embodiments, the difference between the thickness T1 of the first liquid-crystal layer 30 and the thickness T2 of the second liquid-crystal layer 32 may be, for example, 0.3 μm to 2 μm, but is not limited thereto. In some embodiments, the difference between the thickness T1 of the first liquid-crystal layer and the thickness T2 of the second liquid-crystal layer 32 may be, for example, 0.5 μm to 2 μm, but is not limited thereto. The first privacy panel 12 includes a lower substrate 34, an upper substrate 36, and the first liquid-crystal layer 30 located between the lower substrate 34 and the upper substrate 36. The first alignment layer 22 may be disposed between the lower substrate 34 and the first liquid-crystal layer 30. The second alignment layer 24 may be disposed between the upper substrate 36 and the first liquid-crystal layer 30. The second privacy panel 16 includes a lower substrate 38, an upper substrate 40, and the second liquid-crystal layer 32 located between the lower substrate 38 and the upper substrate 40. The third alignment layer 26 may be disposed between the lower substrate 38 and the second liquid-crystal layer 32. The fourth alignment layer 28 may be disposed between the upper substrate and the second liquid-crystal layer 32. In some embodiments, the lower substrates (34 and 38) and/or the upper substrates (36 and 40) include rigid or flexible substrates. The rigid substrate includes, for example, glass, ceramics, other suitable materials, or a combination thereof, but is not limited thereto. The flexible substrate includes, for example, a polyimide (PI) substrate, other suitable materials, or combinations thereof, but the present disclosure is not limited thereto.

The above-mentioned difference between the thickness T1 of the first liquid-crystal layer 30 and the thickness T2 of the second liquid-crystal layer 32 is merely in some exemplary embodiments (e.g., Δn is about 0.2). The difference between the thickness T1 and the thickness T2 may be related to the refractive index difference (Δn=ne−no) of the materials of the first liquid-crystal layer 30 or the second liquid-crystal layer 32. In some embodiments, the difference between the product of the thickness T1 and the refractive index difference (Δn) of the first liquid-crystal layer 30 and the product of the thickness T2 and the refractive index difference (Δn) of the second liquid-crystal layer 32 may be between 60 nm and 400 nm, but is not limited thereto.

The first privacy panel 12 and the second privacy panel 16 may be, for example, electronically controlled birefringence (ECB) mode privacy panels, but are not limited thereto. In FIG. 1B, the alignment direction of the lower alignment layer (i.e. the first alignment layer 22) and the upper alignment layer (i.e. the second alignment layer 24) of the first privacy panel 12 and the alignment direction of the lower alignment layer (i.e. the third alignment layer 26) and the upper alignment layer (i.e. the fourth alignment layer 28) of the second privacy panel 16 may be approximately opposite each other (i.e. mirror image design). For example, the angle between the alignment direction 22" of the first alignment layer 22 and the alignment direction 26" of the third alignment layer 26 may be in a range from about 160 degrees to about 200 degrees. The angle between the alignment direction 24" of the second alignment layer 24 and the alignment direction 28" of the fourth alignment layer 28 may be in a range from about 160 degrees to about 200 degrees.

In addition, referring to FIG. 1A and FIG. 1B, the direction of the absorption axis 14' of the polarizer 14 (for example, towards Y-axis direction) may be substantially parallel to the alignment axis 22' of the first alignment layer 22. That is, the alignment axis 22' of the first alignment layer 22 is, for example, towards Y-axis direction. The direction of the absorption axis 18' of the polarizer 18 may be substantially parallel to the direction of the absorption axis 14' of the polarizer 14. The direction of the absorption axis 18' of the polarizer 18 is, for example, towards Y-axis direction.

In FIG. 1A, the electronic device 10 further includes a polarizer 42 and/or a polarizer 44. The polarizer 42 may be disposed under the first privacy panel 12, that is, the polarizer 14 and the polarizer 42 are located on opposite sides of the privacy panel 12, for example. The polarizer 44 may be disposed on the display panel 20, that is, the polarizer 18 and the polarizer 44 are located on opposite sides of the display panel 20, for example. The direction of the absorption axis 42' of the polarizer 42 may be substantially parallel to the direction of the absorption axis 14' of the polarizer 14. It should be noted that the directions of the absorption axes of the polarizers located on both sides of the display panel 20 (such as a non-self-luminous panel) are, for example, substantially perpendicular to each other. For example, the polarizer 44 and the polarizer 18 may be located on both sides of the display panel 20. The direction of the absorption axis 44' of the polarizer 44 may be substantially perpendicular to the direction of the absorption axis 18' of the polarizer 18. In some embodiments, the absorption axes of the polarizers disposed on both sides of the first privacy panel 12 may be substantially in the same direction (i.e. parallel). For example, the direction of the absorption axis 14' of the polarizer 14 may be substantially parallel to the direction of the absorption axis 42' of the polarizer 42. For example, the direction of the absorption axis 14' and the direction of the absorption axis 42' are substantially parallel to Y-axis, but not limited thereto. The absorption axes of the polarizers disposed on both sides of the second privacy panel 16 may be substantially in the same direction (i.e. parallel). For example, the direction of the absorption axis 14' of the polarizer 14 may be substantially parallel to the direction of the absorption axis 18' of the polarizer 18. For example, the direction of the absorption axis 14' and the direction of the absorption axis 18' are substantially parallel to Y-axis, but not limited thereto. In some embodiments, the first privacy panel 12, the second privacy panel 16 and/or the display panel 20 may selectively share the polarizer. For example, the first privacy panel 12 and the second privacy panel 16 may share the polarizer 14. The second privacy panel 16 and the display panel 20 may share the polarizer 18, but is not limited thereto. In other embodiments (not shown), the first privacy panel 12, the second privacy panel 16 or the display panel 20 may optionally not share the polarizer. For example, another polarizer (not shown) may be added between the first privacy panel 12 and the second privacy panel 16. Moreover, the direction of the absorption axis of the other polarizer and the direction of the absorption axis 14' of the polarizer 14 may be substantially in the same direction (i.e. parallel), or, for example, another polarizer (not shown) may be added between the second privacy panel 16 and the display panel 20. Moreover, the direction of the absorption axis of the other polarizer and the direction of the absorption axis 18' of the polarizer 18 may be substantially in the same direction (i.e. parallel).

FIG. 1C is an enlarged cross-sectional view of two privacy panels of an electronic device in accordance with one embodiment of the present disclosure. The difference between FIG. 1B and FIG. 1C is that the alignment direction 22" of the first alignment layer 22 in the first privacy panel 12 in FIG. 1C is approximately 180 degrees different from the alignment direction 22" of the first alignment layer 22 in the first privacy panel 12 in FIG. 1B. Similarly, the alignment direction 24" of the second alignment layer 24 in the first privacy panel 12 in FIG. 1C is approximately 180 degrees different from the alignment direction 24" of the second alignment layer 24 in the first privacy panel 12 in FIG. 1B. Similarly, the alignment direction 26" of the third alignment layer 26 in the second privacy panel 16 in FIG. 1C is approximately 180 degrees different from the alignment direction 26" of the third alignment layer 26 in the second privacy panel 16 in FIG. 1B. Similarly, the alignment direction 28" of the fourth alignment layer 28 in the second privacy panel 16 in FIG. 1C is approximately 180 degrees different from the alignment direction 28" of the fourth alignment layer 28 in the second privacy panel 16 in FIG. 1B.

It should be noted that when the electronic device of the present disclosure is applied to a car monitor, the direction from the position of the driver (left-hand drive) to the position of the co-driver (on the right side of the driver) is, for example, the arrow direction of X-axis in FIG. 1A.

The evaluation index of the privacy effect of the present disclosure will be described below.

(1) Privacy Ratio (PR): It is measured in privacy mode and expressed by the following equation (I).

$$PR = \frac{L(\theta, \varphi)}{L(0, 0)} \quad \text{(I)}$$

In equation (I), the parameter $\theta$ may represent a tilt angle, which represents an angle with a normal direction (for example, Z-axis direction) of the electronic device. The angle $\theta$ (tilt angle) is, for example, between 0 degrees and ±90 degrees. $\theta$=0 degrees refers to the direction parallel to the normal direction (for example, Z-axis direction) of the electronic device. As the angle $\theta$ (tilt angle) becomes more positive or negative, the angle with the normal direction (for example, Z-axis direction) of the electronic device becomes larger. The parameter $\varphi$ (azimuth angle) may represent an angle on the plane of the X-Y axis. The angle $\varphi$ (azimuth angle) is, for example, between 0 degrees and 360 degrees. L (0, 0) in equation (I) represents the brightness at the central point from top view. That is, $\theta$=0 and $\varphi$=0 represent at the central point from top view. In addition, there may be different specification points in accordance with the application of the electronic device. L ($\theta$, $\varphi$) represents the brightness at the specification points ($\theta$, $\varphi$) of the corresponding product. The smaller the aforementioned privacy ratio (PR) is (that is, the smaller the brightness at the specification points in the privacy mode is), the better the privacy effect is.

(2) ON/OFF ratio: It is expressed by the following equation (II).

$$\text{ON/OFF ratio} = \frac{L(\theta, \varphi)p}{L(\theta, \varphi)s} \quad \text{(II)}$$

In equation (II), the parameters $\theta$ and $\varphi$ are defined as above. L ($\theta$, $\varphi$)s represents the brightness at the specification points corresponding to different $\theta$ and $\varphi$ in the share mode. L ($\theta$, $\varphi$)p represents the brightness at the specification points corresponding to different $\theta$ and $\varphi$ in the privacy mode. The smaller the aforementioned ON/OFF ratio is (that is, the smaller the brightness at the specification point in the privacy mode is), the better the privacy effect is. If the ON/OFF ratio is 1 (maximum value), it means that L ($\theta$, $\varphi$)s=L ($\theta$, $\varphi$)p, which means that there is no privacy effect. In other words, the smaller the ON/OFF ratio is, the larger the brightness variation ratio at the specification points with the privacy panel in the on/off mode is, and the better the privacy effect is.

(3) Chromatic Aberration (Dy): It is measured in privacy mode and expressed by the following equation (III).

$$Dy=y(\theta,\varphi)-y(0,0) \quad \text{(III)}$$

In equation (III), the parameters $\theta$ and $\varphi$ are defined as above. y ($\theta$, $\varphi$) represents the chromaticity at the specification points corresponding to different $\theta$ and $\varphi$. y (0, 0) represents the chromaticity at the central point from top view. The closer the chromatic aberration (Dy) is to zero (that is, the smaller the difference between the chromaticity at the specification points in the privacy mode and the chromaticity at the central point is), the better the privacy effect is, and the smaller the color shift is.

(4) Chromatic Aberration (Dx): It is measured in privacy mode and expressed by the following equation (IV).

$$Dx=x(\theta,\varphi)-x(00) \quad \text{(IV)}$$

In equation (IV), the parameters $\theta$ and $\varphi$ are defined as above. x ($\theta$, $\varphi$) represents the chromaticity at the specification points corresponding to different $\theta$ and $\varphi$. x (0, 0) represents the chromaticity at the central point from top view. The closer the chromatic aberration (Dx) is to zero (that is, the smaller the difference between the chromaticity at the specification points in the privacy mode and the chromaticity at the central point is), the better the privacy effect is, and the smaller the color shift is.

(5) Sum of Chromatic Aberration ($\Sigma\Delta y$): It is expressed by the following equation (V).

$$\Sigma\Delta y=\Sigma(yp-ys) \quad \text{(V)}$$

In equation (V), the parameter yp represents the chromaticity at each point in the privacy mode within the viewing range (for example, the driver's viewing range). The parameter ys represents the chromaticity at the specification points in the share mode. The sum of the chromatic aberration ($\Sigma\Delta y$) represents the sum of the chromatic aberration between the chromaticity yp and ys at each point. The smaller the sum of the chromatic aberration (ΣΔy) is (that is, the smaller the sum of the chromatic aberration between the chromaticity at each point in the privacy mode and the chromaticity at the specification points in the share mode within the viewing angle range is), the better the privacy effect is, and the smaller the color shift is.

(6) Sum of Chromatic Aberration (ΣΔx): It is expressed by the following equation (VI).

$$\Sigma\Delta x = \Sigma(xp - xs) \quad (VI)$$

In equation (VI), the parameter xp represents the chromaticity at each point in the privacy mode within the viewing range (for example, the driver's viewing range). The parameter xs represents the chromaticity at the specification points in the share mode. The sum of the chromatic aberration (ΣΔx) represents the sum of the chromatic aberration between the chromaticity xp and xs at each point. The smaller the sum of the chromatic aberration (ΣΔx) is (that is, the smaller the sum of the chromatic aberration between the chromaticity at each point in the privacy mode and the chromaticity at the specification points in the share mode within the viewing angle range is), the better the privacy effect is, and the smaller the color shift is.

With regard to the privacy panel of the electronically controlled birefringence (ECB) mode, the position of the viewing angle (area) with the darkest brightness in the electronic device may be adjusted by controlling the voltage or the thickness of the liquid-crystal layer.

Figure 2:
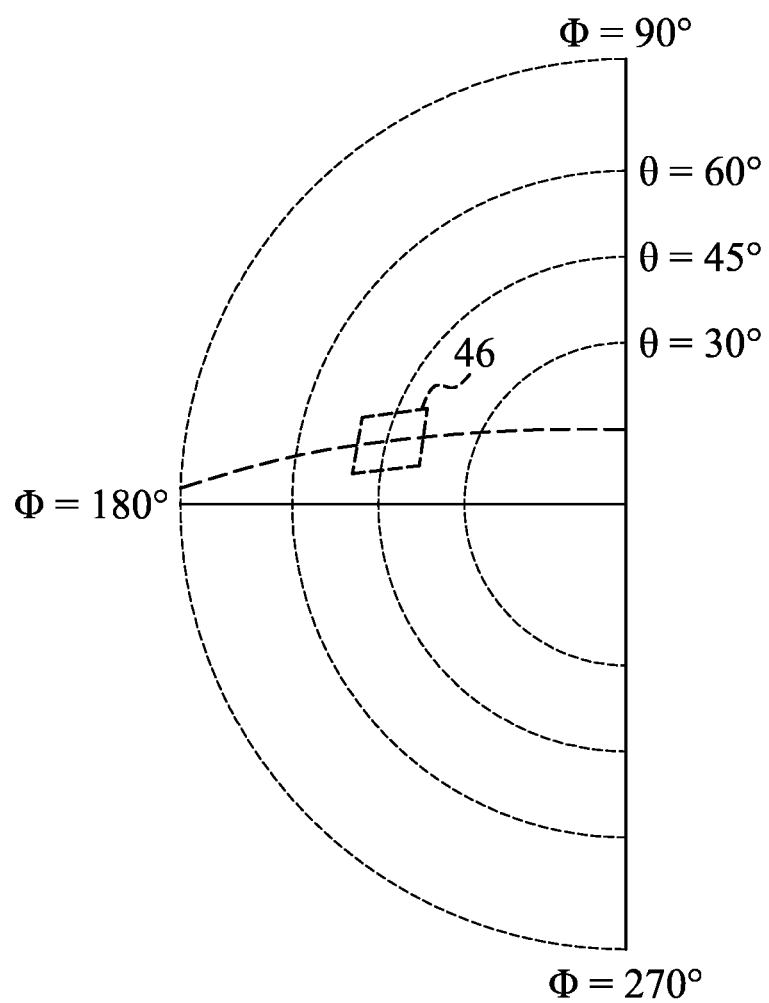
FIG. 2 shows a specific viewing-angle area in accordance with one embodiment of the present disclosure.

FIG. 2 shows a specific viewing-angle area in accordance with one embodiment of the present disclosure.

Referring to FIG. 2, the specific viewing-angle area 46 is disclosed (for example, the area bounded by the ranges extending approximately 7 degrees to 10 degrees in horizontal and vertical directions from the specification point respectively). The above-mentioned specific viewing-angle area 46 is, for example, a driver's specific viewing-angle area. The following uses Examples 1 and 2 to illustrate the variations in the brightness and chromatic aberration within the above-mentioned area when the liquid-crystal layer of a single privacy panel has different thicknesses.

Example 1

Single Privacy Panel (the First Privacy Panel 12 Shown in FIG. 1C)

Figures 1, 3:
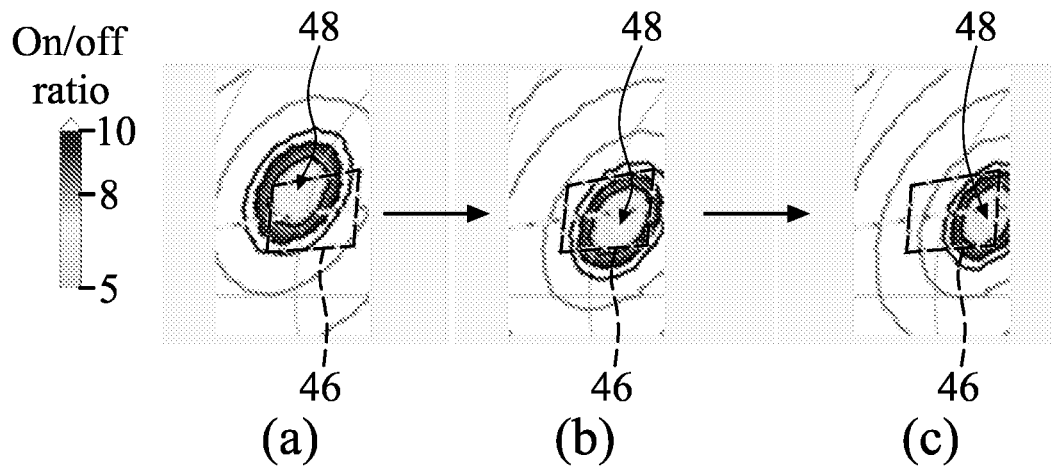
FIGS. 3-1($a$)-($c$) show diagrams of a lowest brightness area varying with thickness of a liquid-crystal layer under a specific viewing-angle area with a single privacy panel in accordance with one embodiment of the present disclosure.
Figures 2, 3:
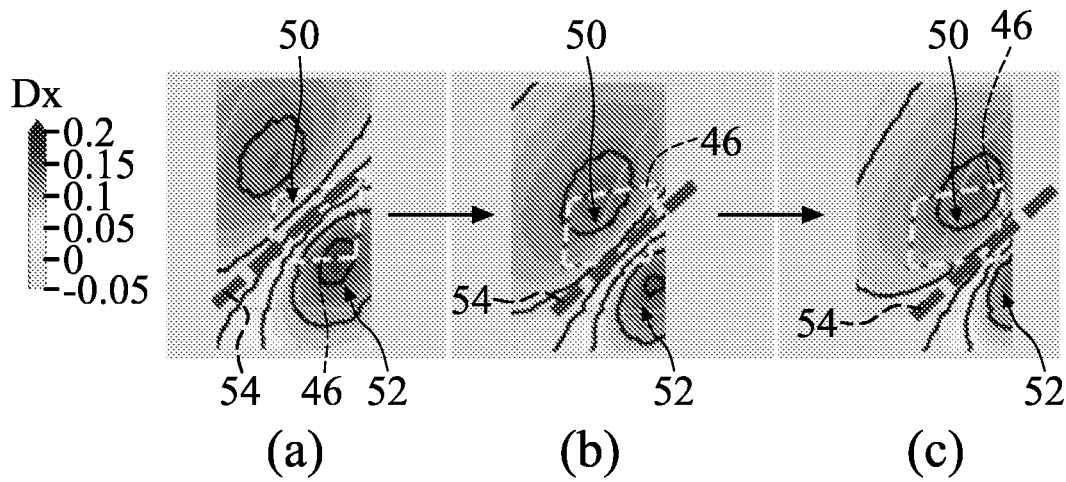
Figure 3:
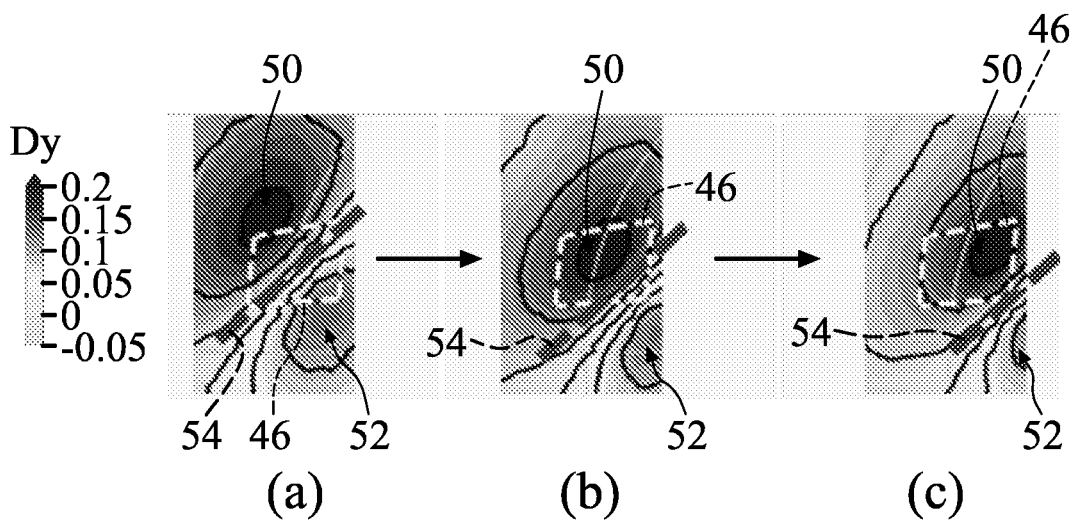

FIG. 3-1 shows diagrams (for example, simulation diagrams) of a lowest brightness area varying with thickness of a liquid-crystal layer under a specific viewing-angle area, with a single privacy panel, in accordance with one embodiment of the present disclosure (Example 1). FIG. 3-1 is obtained, for example, according to the above-mentioned equation (II) of the evaluation index, that is, "ON/OFF ratio". The area with the minimum ON/OFF ratio may represent the lowest brightness area. The lowest brightness area is, for example, equivalent to the area with the largest brightness variation ratio with the privacy panel in the on/off mode. The smaller the brightness variation ratio is, the better the privacy effect is.

FIG. 3-2 shows diagrams (for example, simulation diagrams) of a chromaticity (Dx) varying with thickness of a liquid-crystal layer under a specific viewing-angle area, with a single privacy panel, in accordance with one embodiment of the present disclosure (Example 1). The chromaticity (Dx) in FIG. 3-2 is obtained, for example, according to the above-mentioned equation (IV) of the evaluation index.

FIG. 3-3 shows diagrams (for example, simulation diagrams) of a chromaticity (Dy) varying with thickness of a liquid-crystal layer under a specific viewing-angle area, with a single privacy panel, in accordance with one embodiment of the present disclosure (Example 1). The chromaticity (Dy) in FIG. 3-3 is obtained, for example, according to the above-mentioned equation (III) of the evaluation index.

Referring to FIG. 3-1, it can be seen from FIG. 3-1 that when the thickness of the liquid-crystal layer is small, the lowest brightness area 48 (that is, the area with the minimum value of ON/OFF ratio) is, for example, roughly located in the left half of the specific viewing-angle area 46 (i.e. a driver's viewing-angle area), as shown in FIG. 3-1(a). As the thickness of the liquid-crystal layer varies from small to large, the lowest brightness area 48, for example, gradually moves towards the direction in which θ becomes smaller, as shown in FIG. 3-1(b), and finally to the right half of the driver's specific viewing-angle area 46, as shown in FIG. 3-1(c).

Referring to FIG. 3-2, FIG. 3-2 includes a negative-deviation area 50 (that is, Dx in the evaluation index in this area is a negative value), a positive-deviation area 52 (that is, Dx in the evaluation index in this area is a positive value), and a non-chromatic-aberration area 54 (that is, Dx in the evaluation index in this area is zero). The negative-deviation area 50 is an area formed by the points with negative values after subtracting the chromaticity x at the central point from the chromaticity x at each point in the privacy mode. The positive-deviation area 52 is an area formed by the points with positive values after subtracting the chromaticity x at the central point from the chromaticity x at each point in the privacy mode. The non-chromatic-aberration area 54 is an area formed by the points close to zero after subtracting the chromaticity x at the central point from the chromaticity x at each point in the privacy mode. Compared with the non-chromatic-aberration area 54, the negative-deviation area 50 is, for example, an area with relatively bluish chroma, but is not limited thereto. Compared with the non-chromatic-aberration area 54, the positive-deviation area 52 is, for example, an area with relatively yellowish chroma, but is not limited thereto. It can be seen from FIG. 3-2 that when the thickness of the liquid-crystal layer is small, the proportion of the negative-deviation area 50 in the specific viewing-angle area 46 (i.e. a driver's specific viewing-angle area) is larger than that of the positive-deviation area 52, as shown in FIG. 3-2(a). As the thickness of the liquid-crystal layer varies from small to large, the proportion of the negative-deviation area 50 in the specific viewing-angle area 46 is more enlarged, as shown in FIG. 3-2(b), and finally to almost occupy the specific viewing-angle area 46, as shown in FIG. 3-2(c).

Referring to FIG. 3-3, similar to FIG. 3-2, FIG. 3-3 includes a negative-deviation area 50 (that is, Dy in the evaluation index in this area is a negative value), a positive-deviation area 52 (that is, Dy in the evaluation index in this area is a positive value), and a non-chromatic-aberration area 54 (that is, Dy in the evaluation index in this area is zero). The negative-deviation area 50 is an area formed by the points with negative values after subtracting the chromaticity y at the central point from the chromaticity y at each point in the privacy mode. The positive-deviation area 52 is an area formed by the points with positive values after subtracting the chromaticity y at the central point from the chromaticity y at each point in the privacy mode. The non-chromatic-aberration area 54 is an area formed by the points close to zero after subtracting the chromaticity y at the central point from the chromaticity y at each point in the privacy mode. Compared with the non-chromatic-aberration area 54, the negative-deviation area 50 is, for example, an area with relatively bluish chroma, but is not limited thereto. Compared with the non-chromatic-aberration area 54, the positive-deviation area 52 is, for example, an area with relatively yellowish chroma, but is not limited thereto. It can be seen from FIG. 3-3 that when the thickness of the liquid-crystal layer is small, the proportion of the negative-deviation area 50 in the specific viewing-angle area 46 (i.e. a driver's specific viewing-angle area) is larger than that of the positive-deviation area 52, as shown in FIG. 3-3(*a*). As the thickness of the liquid-crystal layer varies from small to large, the proportion of the negative-deviation area 50 in the specific viewing-angle area 46 is more enlarged, as shown in FIG. 3-3(*b*), and finally to almost occupy the specific viewing-angle area 46, as shown in FIG. 3-3(*c*).

It should be noted that the result diagrams in FIGS. 3-1 to 3-3 are merely used as an example of one of the embodiments. The lowest brightness area 48 shown in FIG. 3-1, or the non-chromatic-aberration area 54 (Dx=0), the negative-deviation area 50 (Dx<0) or the positive-deviation area 52 (Dx>0) as shown in FIG. 3-2, or the non-chromatic-aberration area 54 (Dy=0), the negative-deviation area 50 (Dy<0) or the positive-deviation area 52 (Dy>0) as shown in FIG. 3-3, may be slightly different according to the material selection of each layer (such as liquid-crystal layer or substrate, but not limited thereto) in the privacy panel to be measured or the thickness of the liquid-crystal layer.

Example 2

Single Privacy Panel (the Second Privacy Panel 16 Shown in FIG. 1C)

Figures 1, 4:
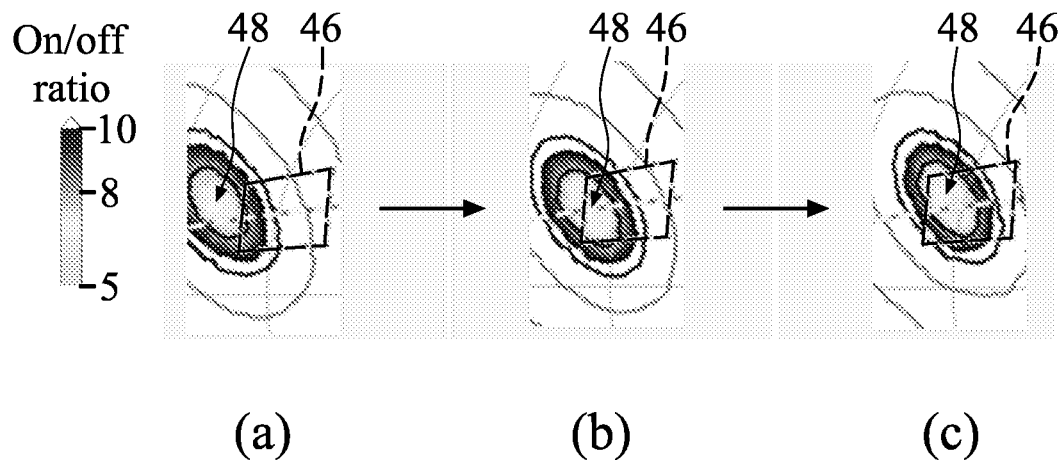
Figures 2, 4:
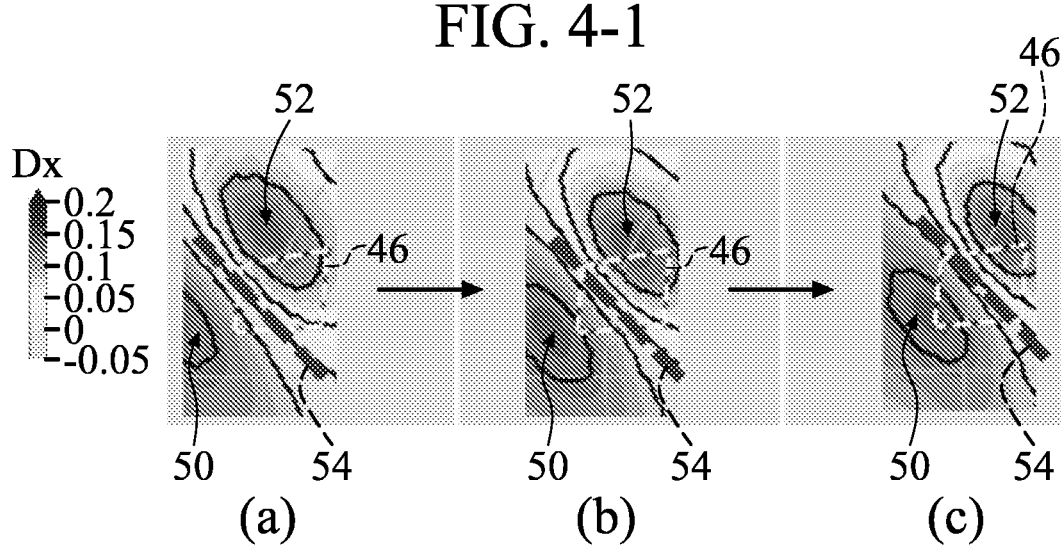
Figures 3, 4:
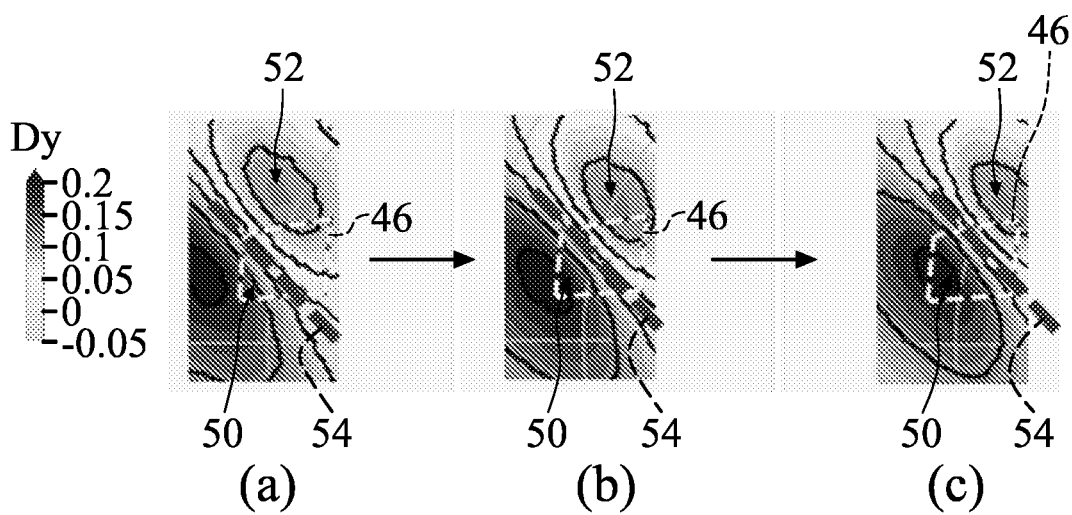

FIG. 4-1 shows diagrams (for example, simulation diagrams) of a lowest brightness area varying with thickness of a liquid-crystal layer under a specific viewing-angle area, with a single privacy panel, in accordance with another embodiment of the present disclosure (Example 2). FIG. 4-1 is obtained, for example, according to the above-mentioned equation (II) of the evaluation index, that is, "ON/OFF ratio". The area with the minimum ON/OFF ratio may represent the lowest brightness area. The lowest brightness area is, for example, equivalent to the area with the largest brightness variation ratio with the privacy panel in the on/off mode. The smaller the brightness variation ratio is, the better the privacy effect is.

FIG. 4-2 shows diagrams (for example, simulation diagrams) of a chromaticity (Dx) varying with thickness of a liquid-crystal layer under a specific viewing-angle area, with a single privacy panel (for example, the second privacy panel 16 shown in FIG. 1C), in accordance with another embodiment of the present disclosure (Example 2). The chromaticity (Dx) in FIG. 4-2 is obtained, for example, according to the above-mentioned equation (IV) of the evaluation index.

FIG. 4-3 shows diagrams (for example, simulation diagrams) of a chromaticity (Dy) varying with thickness of a liquid-crystal layer under a specific viewing-angle area, with a single privacy panel, in accordance with another embodiment of the present disclosure (Example 2). The chromaticity (Dy) in FIG. 4-3 is obtained, for example, according to the above-mentioned equation (III) of the evaluation index. Referring to FIG. 4-1, it can be seen from FIG. 4-1 that when the thickness of the liquid-crystal layer is small, the lowest brightness area 48 (roughly the area with the minimum value of ON/OFF ratio) is, for example, adjacent to the left half of the specific viewing-angle area 46 (i.e. a driver's viewing-angle area), but not located in the specific viewing-angle area 46, as shown in FIG. 4-1(*a*). As the thickness of the liquid-crystal layer varies from small to large, the lowest brightness area 48 gradually moves towards the direction in which θ becomes smaller, as shown in FIG. 4-1(*b*), and finally to the left half of the specific viewing-angle area 46, as shown in FIG. 4-1(*c*).

Referring to FIG. 4-2, FIG. 4-2 includes a negative-deviation area 50 (that is, Dx in the evaluation index in this area is a negative value), a positive-deviation area 52 (that is, Dx in the evaluation index in this area is a positive value), and a non-chromatic-aberration area 54 (that is, Dx in the evaluation index in this area is zero). The definition of the negative-deviation area 50, the positive-deviation area 52 and the non-chromatic-aberration area 54 may refer to FIG. 3-2 above. It can be seen from FIG. 4-2 that when the thickness of the liquid-crystal layer is small, the proportion of the positive-deviation area 52 in the specific viewing-angle area 46 (for example, a driver's specific viewing-angle area) is larger than that of the negative-deviation area 50, as shown in FIG. 4-2(*a*). As the thickness of the liquid-crystal layer varies from small to large, the proportion of the negative-deviation area 50 in the specific viewing-angle area 46 (for example, a driver's specific viewing-angle area) is more enlarged, as shown in FIG. 4-2(*b*), and finally to account for more than half of the driver's specific viewing-angle area 46, as shown in FIG. 4-2(*c*).

Referring to FIG. 4-3, FIG. 4-3 includes a negative-deviation area 50 (that is, Dy in the evaluation index in this area is a negative value), a positive-deviation area 52 (that is, Dy in the evaluation index in this area is a positive value), and a non-chromatic-aberration area 54 (that is, Dy in the evaluation index in this area is zero). It can be seen from FIG. 4-3 that when the thickness of the liquid-crystal layer is small, the proportion of the positive-deviation area 52 in the specific viewing-angle area 46 (for example, a driver's specific viewing-angle area) is larger than that of the negative-deviation area 50, as shown in FIG. 4-3(*a*). As the thickness of the liquid-crystal layer varies from small to large, the proportion of the negative-deviation area 50 in the specific viewing-angle area 46 (for example, a driver's specific viewing-angle area) is more enlarged, as shown in FIG. 4-3(*b*), and finally to account for more than half of the driver's specific viewing-angle area 46, as shown in FIG. 4-3(*c*).

It should be noted that the result diagrams in FIGS. 4-1 to 4-3 are merely used as an example of one of the embodiments. The lowest brightness area 48 shown in FIG. 4-1, or the non-chromatic-aberration area 54 (Dx=0), the negative-deviation area 50 (Dx<0) or the positive-deviation area 52 (Dx>0) as shown in FIG. 4-2, or the non-chromatic-aberration area 54 (Dy=0), the negative-deviation area 50 (Dy<0) or the positive-deviation area 52 (Dy>0) as shown in FIG. 4-3, may be slightly different according to the material selection of each layer (such as liquid-crystal layer or substrate, but not limited thereto) in the privacy panel to be measured, the thickness of the liquid-crystal layer or the brightness uniformity of the backlight used.

The result diagrams in FIGS. 3-1 to 3-3 or the result diagrams in FIGS. 4-1 to 4-3 are, for example, measured under a backlight with high brightness uniformity. For example, a light source whose luminance value varies within 20% or within 10% under different viewing angles, but not limited thereto.

Comparative Example 1

Dual Privacy Panels with the Same Alignment Direction

The same alignment direction of the above-mentioned dual privacy panels means that the alignment directions of the lower alignment layers of the two privacy panels are approximately the same, and the alignment directions of the upper alignment layers of the two privacy panels are approximately the same.

Table 1 below shows Dx (x_specification points-x (0, 0)), Dx (min), Dx (max) and ΣΔx under the conditions simulating Comparative Example 1, and the calculation method may employ equation (IV) of Dx=x(θ, φ)−x(0,0) and equation (VI) of ΣΔx=Σ(xp−xs) in the above evaluation index.

Table 2 below shows Dy (y_specification points-y (0, 0)), Dy (min), Dy (max) and ΣΔy under the conditions simulating Comparative Example 1, and the calculation method may employ equation (III) of Dy=y(θ, φ)−y(0,0) and equation (V) of ΣΔy=Σ(yp−ys) in the above evaluation index.

TABLE 1

| | |
|---|---|
| Dx (x_specification points-x (0, 0)) | −0.044 |
| Dx (min) | −0.119 |
| Dx (max) | 0.117 |
| ΣΔx | 13.055 |

TABLE 2

| | |
|---|---|
| Dy (y_specification points-y (0, 0)) | −0.138 |
| Dy (min) | −0.212 |
| Dy (max) | 0.030 |
| ΣΔy | 26.343 |

According to the above simulation results (as shown in Table 1), Dx (x_specification points-x (0, 0)) is −0.044, Dx (min) is −0.119, Dx (max) is 0.117, and the sum of chromatic aberration (ΣΔx) is 13.055. In addition, according to the number of points measured, the average chromatic aberration in the driver's specific viewing-angle area is obtained as 0.082.

According to the above simulation results (as shown in Table 2), Dy (y_specification points-y (0, 0)) is −0.138, Dy (min) is −0.212, Dy (max) is 0.030, and the sum of chromatic aberration (ΣΔy) is 26.343. In addition, according to the number of points measured, the average chromatic aberration in the driver's specific viewing-angle area is obtained as 0.116.

Example 3

Dual Privacy Panels with Reverse Alignment Directions

The reverse alignment directions of the above-mentioned dual privacy panels mean that the alignment directions of the lower alignment layers of the two privacy panels are roughly opposite, and the alignment directions of the upper alignment layers of the two privacy panels are roughly opposite, such as the situation illustrated in FIGS. 1B and 1C.

Figure 5B:
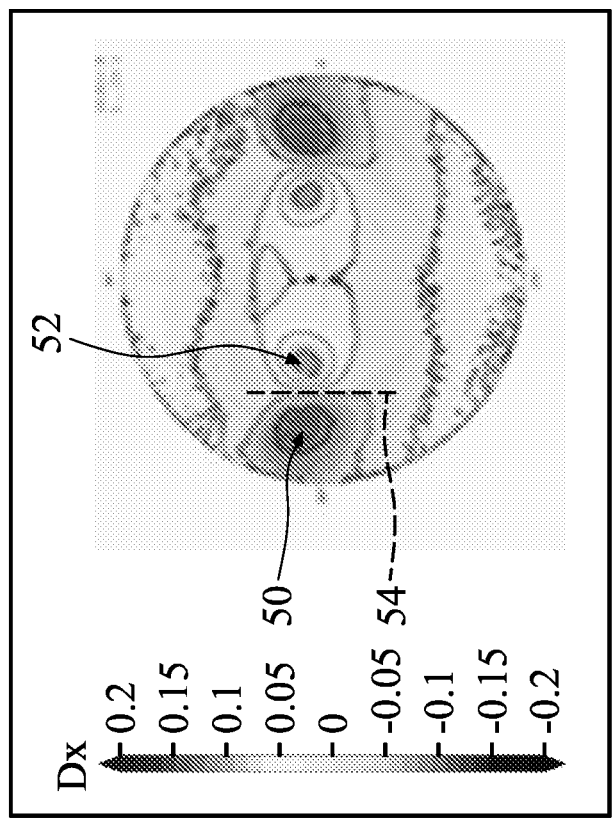
FIG. 5B shows a partial enlarged view of a specific viewing-angle area in FIG. 5A.
Figure 5A:
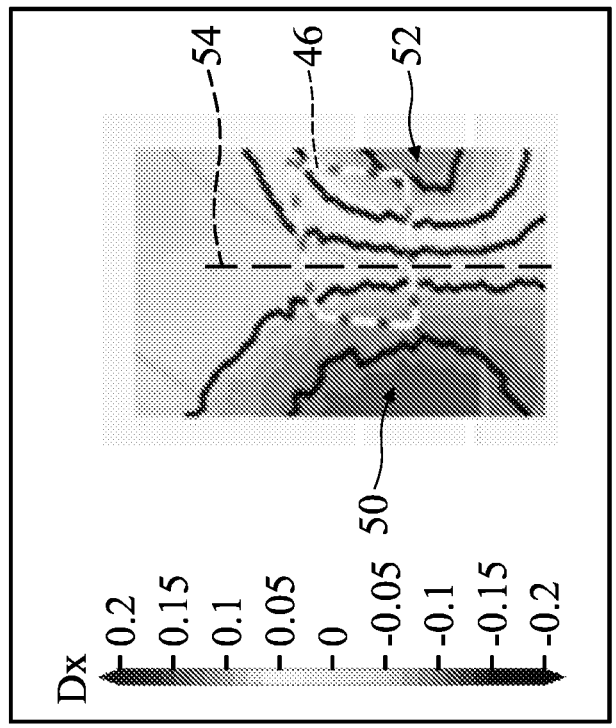
FIG. 5A shows a diagram of a chromatic aberration (Dx) with dual privacy panels in accordance with one embodiment of the present disclosure.

FIG. 5A shows a chromatic aberration (Dx) diagram, with dual privacy panels, in accordance with one embodiment of the present disclosure (for example, Example 3). FIG. 5B shows a partial enlarged view of a specific viewing-angle area in FIG. 5A. FIG. 5A shows the chromatic aberration (Dx) diagram (e.g. a chromatic aberration (Dx) CONO diagram) under, for example, the conditions simulating the above-mentioned Example 3 and the conditions that the thicknesses of the two liquid-crystal layers in the dual privacy panels are different. FIG. 5A shows a negative-deviation area 50 (i.e. the area where Dx is negative), a positive-deviation area 52 (i.e. the area where Dx is positive), and a non-chromatic-aberration area 54 (i.e. the area where Dx is zero).

In addition, Table 3 below shows Dx (x_specification points-x (0, 0)), Dx (min), Dx (max) and ΣΔx under the conditions simulating Example 3, and the calculation method may employ equation (IV) of Dx=x(θ,φ)−x(0,0) and equation (VI) of ΣΔx=Σ(xp−xs) in the above evaluation index.

TABLE 3

| | |
|---|---|
| Dx (x_specification points-x (0, 0)) | −0.007 |
| Dx (min) | −0.100 |
| Dx (max) | 0.104 |
| ΣΔx | 8.528 |

It can be obtained from FIGS. 5A and 5B (or Table 3 above) that Dx (x_specification points-x (0, 0)) is −0.007, Dx (min) is −0.100, Dx (max) is 0.104, and the sum of chromatic aberration (ΣΔx) is 8.528. Next, according to the number of points measured, the average chromatic aberration in the driver's specific viewing-angle area 46 is 0.054.

Figure 6B:
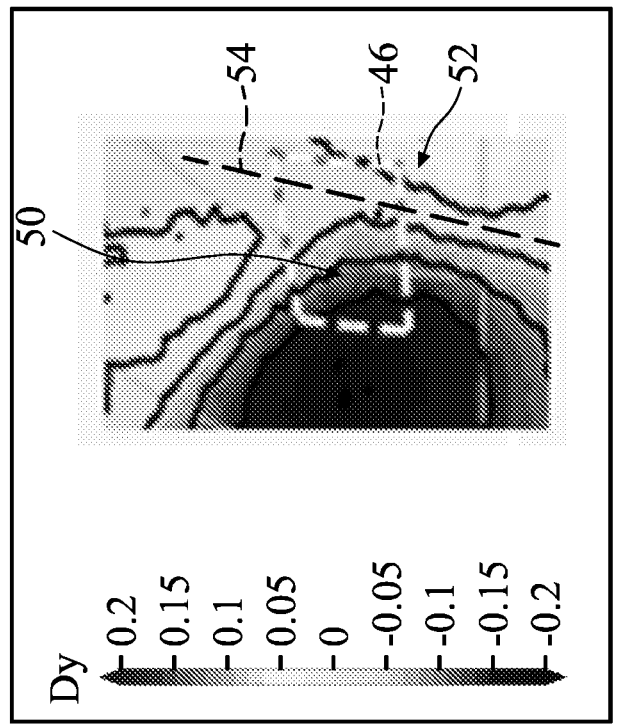
FIG. 6B shows a partial enlarged view of the specific viewing-angle area in FIG. 6A.
Figure 6A:
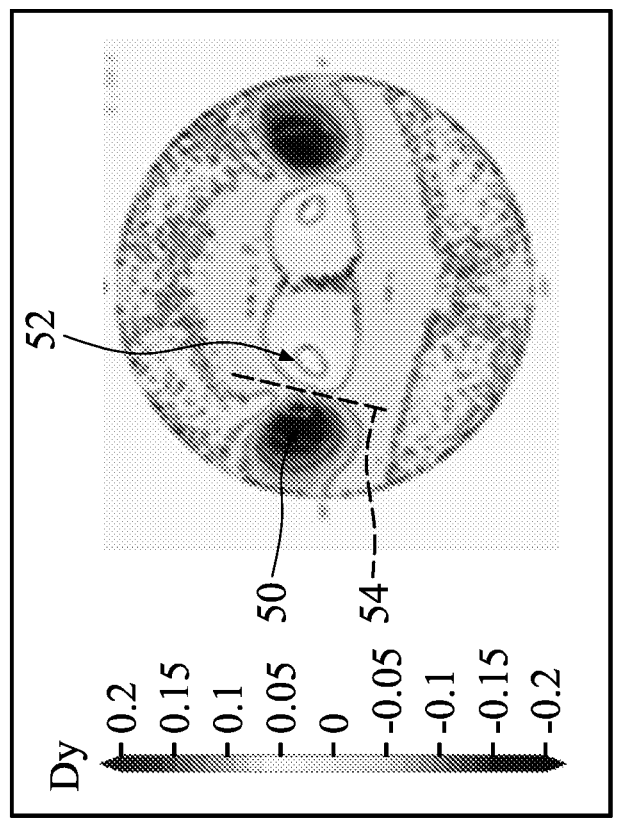
FIG. 6A shows a diagram of a chromatic aberration (Dy) with dual privacy panels in accordance with one embodiment of the present disclosure.

FIG. 6A shows a chromatic aberration (Dy) diagram, with dual privacy panels, in accordance with one embodiment of the present disclosure (for example, Example 3). FIG. 6B shows a partial enlarged view of a specific viewing-angle area in FIG. 6A.

FIG. 6A shows the chromatic aberration (Dy) diagram (e.g. a chromatic aberration (Dy) CONO diagram) under, for example, the conditions simulating the above-mentioned Example 3 and the conditions that the thicknesses of the two liquid-crystal layers in the dual privacy panels are different. FIG. 6A shows a negative-deviation area 50 (i.e. the area where Dy is negative), a positive-deviation area 52 (i.e. the area where Dy is positive), and a non-chromatic-aberration area 54 (i.e. the area where Dy is zero).

In addition, Table 4 below shows Dy (y_specification points-y (0, 0)), Dy (min), Dy (max) and ΣΔy under the conditions simulating Example 3, and the calculation method may employ equation (III) of Dy=y(θ,φ)−y(0,0) and equation (V) of ΣΔy=Σ(yp−ys) in the above evaluation index.

TABLE 4

| | |
|---|---|
| Dy (y_specification points-y (0, 0)) | −0.085 |
| Dy (min) | −0.192 |
| Dy (max) | 0.012 |
| ΣΔy | 16.696 |

It can be obtained from FIGS. 6A and 6B (or Table 4 above) that Dy (y_specification points-y (0, 0)) is −0.085, Dy (min) is −0.192, Dy (max) is 0.012, and the sum of chromatic aberration (ΣΔy) is 16.696. Next, according to the number of points measured, the average chromatic aberration in the driver's specific viewing-angle area 46 is 0.105.

Compared with Comparative Example 1, in Example 3, the minimum value of chromatic aberration (Dx (min) or Dy (min)), the maximum value of chromatic aberration (Dx (max) or Dy (max)), the sum of chromatic aberration (ΣΔx or ΣΔy) and/or the average chromatic aberration are all lower than the numerical values of Comparative Example 1. It is obvious that the present disclosure adopts the configuration of dual privacy panels with opposite alignment directions (i.e. a mirror alignment), which can improve the problem of bluish chromatic aberration in the specific viewing-angle area 46 (such as a driver's specific viewing-angle area) in the privacy mode through the mutual compensation effect between the positive-deviation and negative-deviation areas of chromaticity, effectively reducing the chromatic aberration in the specific viewing-angle area, so that, during the process of switching between the share mode and the privacy mode, the driver will not feel the chromatic aberration of the screen, which will affect the driving concentration.

Figure 7:
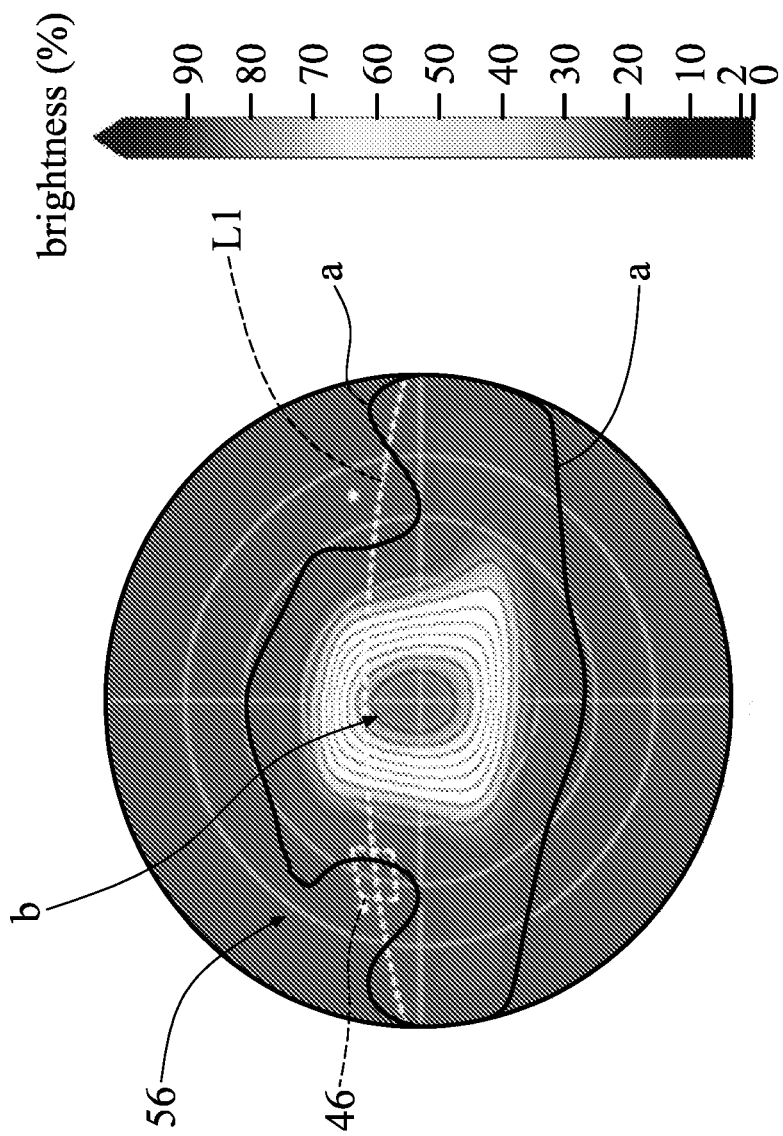
FIG. 7 shows a brightness diagram with dual privacy panels in accordance with one embodiment of the present disclosure.

FIG. 7 shows a brightness diagram, with dual privacy panels, in accordance with one embodiment of the present disclosure. FIG. 7 shows the brightness diagram (CONO diagram) in the privacy mode when the alignment directions of the dual privacy panels are reversed (i.e. a mirror alignment) and the thicknesses of the two liquid-crystal layers in the dual privacy panels are different. In FIG. 7, for example, the brightness of the central point (0, 0) in the privacy mode is taken as 100%. A luminance equipotential line "a" is marked on the figure (for example, a luminance equipotential line with a brightness of 2%, and the area outside the area surrounded by the luminance equipotential line "a" represents the area with a brightness lower than 2%). A luminance equipotential line "b" is further marked on the figure (for example, a luminance equipotential line with a brightness of 90%, and the area surrounded by the luminance equipotential line "b" represents the area with a brightness higher than 90%). It can be seen from FIG. 7, in the present disclosure, by matching the dual privacy panels with opposite alignment directions (i.e. a mirror alignment) and/or with different thicknesses of the liquid-crystal layers, the area with a brightness lower than 2% accounts for a large proportion in the specific viewing-angle area 46 (for example, a driver's specific viewing-angle area), which can effectively improve the viewing taste in the privacy mode. It should be noted that FIG. 7 is a brightness diagram (CONO diagram) in the privacy mode obtained by simulating the condition that the two liquid-crystal layers in the dual privacy panels have different thicknesses. However, according to other simulations (not shown), under the conditions that the dual privacy panels have opposite alignment directions (i.e. a mirror alignment) and the two liquid-crystal layers in the dual privacy panels have the same thickness, the viewing taste in the privacy mode can still be improved. In FIG. 7, for example, by further adjusting the thicknesses relationship between the two liquid-crystal layers, the viewing taste in the privacy mode can thus be further improved.

Figure 8:
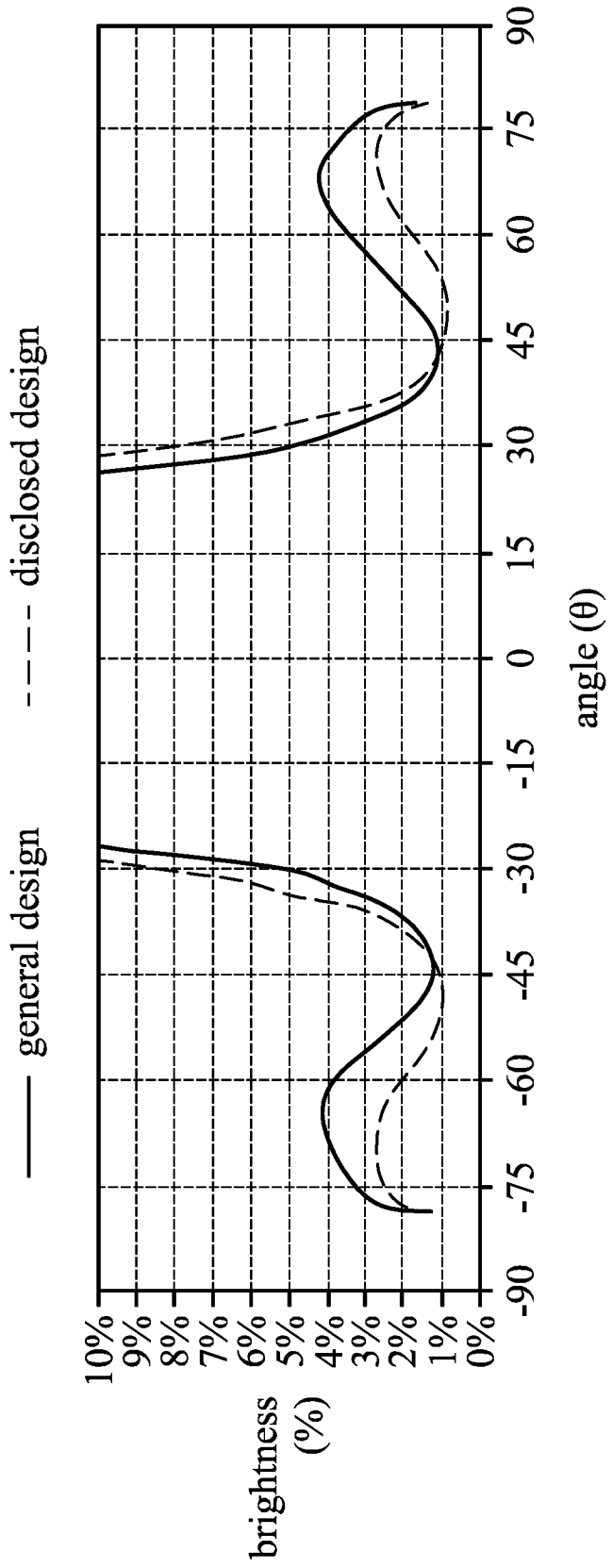
FIG. 8 shows a relationship between θ and brightness with dual privacy panels under a driver's viewing angle in accordance with one embodiment of the present disclosure.

FIG. 8 shows a relationship diagram between θ and brightness, with dual privacy panels, under a driver's viewing angle in accordance with one embodiment of the present disclosure (such as the embodiment of FIG. 7). FIG. 8 is, for example, a relationship diagram between θ and brightness (L %) taken from the line segment L1 in FIG. 7 (such as the curve designed by the present disclosure in the figure). The line segment L1 is, for example, at about 14-15 degrees of β, but not limited thereto. The angle β is, for example, an angle with the normal direction of the dual privacy panels. Under other requirements, the angle β may be selected from 0 to 20 degrees. It can be seen from FIG. 8 that, compared with the curve of the general design (the same alignment direction of the dual privacy panels), the brightness (L %) of the curve designed by the present disclosure (the reversed alignment directions of the dual privacy panels) decreases at a large viewing angle (i.e., θ is ±50 degrees to ±80 degrees), so the privacy effect of the large viewing angle is improved. That is, compared with the general design, the disclosed design can reduce the brightness of the area with a large viewing angle, or improve the problem of light leakage or taste at a large viewing angle.

Referring to FIG. 9, in accordance with one embodiment of the present disclosure, an electronic device 10 is provided. FIG. 9 is the cross-sectional view of the electronic device 10.

The embodiment of the electronic device 10 disclosed in FIG. 9 is similar to the embodiment of the electronic device 10 disclosed in FIG. 1, and the similarities will not be repeated. The difference between the two is the configuration relationship of the first privacy panel 12, the second privacy panel 16 and the display panel 20. In FIG. 9, the second privacy panel 16 is disposed on the first privacy panel 12. The display panel 20 is disposed under the first privacy panel 12. The backlight 58 is disposed, for example, under the display panel 20 (such as a non-self-luminous panel). In this embodiment, the polarizer 18 is disposed, for example, between the first privacy panel 12 and the second privacy panel 16. The polarizer 14 is disposed, for example, between the first privacy panel 12 and the display panel 20. The direction of the absorption axis of the polarizer 14 (such as X-axis direction, but not limited thereto) is parallel to the direction of the absorption axis of the polarizer 18 (such as X-axis direction, but not limited thereto). In this embodiment, the configurations of the polarizer 14, the polarizer 18, the polarizer 42 and the polarizer 44 can be adjusted correspondingly. For example, the directions of the absorption axis of the polarizer 14, the absorption axis of the polarizer 18, and the absorption axis of the polarizer 44 may be substantially parallel (for example, parallel to X-axis, but not limited thereto). The direction of the absorption axis of the polarizer 42 may be substantially perpendicular to that of the absorption axis of the polarizer 14 (for example, parallel to Y axis, but not limited thereto).

Referring to FIG. 10, in accordance with one embodiment of the present disclosure, an electronic device 10 is provided. FIG. 10 is the cross-sectional view of the electronic device 10.

The embodiment of the electronic device 10 disclosed in FIG. 10 is similar to the embodiment of the electronic device 10 disclosed in FIG. 1, and the similarities will not be repeated. The difference between the two is the configuration relationship of the first privacy panel 12, the second privacy panel 16 and the display panel 20. In FIG. 10, the second privacy panel 16 is disposed on the first privacy panel 12. The display panel 20 (such as a non-self-luminous panel) is disposed between the first privacy panel 12 and the second privacy panel 16. The backlight 58 is disposed under the first privacy panel 12. In this embodiment, the configurations of the polarizer 14, the polarizer 18, the polarizer 42 and the polarizer 44 can be adjusted correspondingly. The direction of the absorption axis of the polarizer 14 is substantially parallel to the direction of the absorption axis of the polarizer 42 (for example, parallel to Y axis, but not limited thereto). The direction of the absorption axis of the polarizer 18 is substantially parallel to the direction of the absorption axis of the polarizer 44 (for example, parallel to X axis, but not limited thereto). The direction of the absorption axis of the polarizer 14 is substantially perpendicular to the direction of the absorption axis of the polarizer 18.

In other embodiments (not shown), the display panel 20 is, for example, a self-luminous panel, and the first privacy panel 12 and the second privacy panel 16 may be both disposed on the display panel 20. The first privacy panel 12 may be located between the display panel 20 and the second privacy panel 16. The display panel 20 and the first privacy panel 12 may share a polarizer as required.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:
a first privacy panel having a first alignment layer and a second alignment layer opposite each other, and a first liquid-crystal layer disposed between the first alignment layer and the second alignment layer; and
a second privacy panel disposed on the first privacy panel, having a third alignment layer and a fourth alignment layer opposite each other, and a second liquid-crystal layer disposed between the third alignment layer and the fourth alignment layer;
a display panel disposed between the first privacy panel and the second privacy panel;
a first polarizer disposed between the display panel and the second privacy panel;
a second polarizer disposed between the display panel and the first privacy panel;
a third polarizer disposed on the second privacy panel; and
a fourth polarizer disposed below the first privacy panel,
wherein the second alignment layer and the third alignment layer are located between the first alignment layer and the fourth alignment layer, an alignment axis of the first alignment layer, an alignment axis of the second alignment layer, an alignment axis of the third alignment layer and an alignment axis of the fourth alignment layer are parallel, an angle between an alignment direction of the first alignment layer and an alignment direction of the third alignment layer is between 160 degrees and 200 degrees, and an angle between an alignment direction of the second alignment layer and an alignment direction of the fourth alignment layer is between 160 degrees and 200 degrees,
wherein the alignment direction of the second alignment layer is the same as the alignment direction of the third alignment layer,
wherein a direction of an absorption axis of the first polarizer is perpendicular to a direction of an absorption axis of the second polarizer,
the direction of the absorption axis of the second polarizer is parallel to a direction of an absorption axis of the fourth polarizer, and
the direction of the absorption axis of the first polarizer is parallel to a direction of an absorption axis of the third polarizer.

2. The electronic device as claimed in claim 1, wherein an angle between the alignment direction of the first alignment layer and the alignment direction of the second alignment layer is between 160 degrees and 200 degrees, and an angle between the alignment direction of the third alignment layer and the alignment direction of the fourth alignment layer is between 160 degrees and 200 degrees.

3. The electronic device as claimed in claim 1, wherein a difference between a thickness of the first liquid-crystal layer and the thickness of a second liquid-crystal layer is between 0.3 μm and 2 μm.

4. The electronic device as claimed in claim 1, wherein the first privacy panel and the second privacy panel are privacy panels with an electronically controlled birefringence ECB) mode.

5. The electronic device as claimed in claim 1, wherein the absorption axis of the first polarizer is parallel to the alignment axis of the first alignment layer.

6. The electronic device as claimed in claim 1, further comprising a backlight disposed under the first privacy panel.

7. The electronic device as claimed in claim 6, wherein the display panel is a non-self-luminous panel.

* * * * *